United States Patent [19]

Karriker

[11] Patent Number: 4,964,419
[45] Date of Patent: Oct. 23, 1990

[54] KEYLESS HANDCUFFS

[76] Inventor: Roy L. Karriker, P.O. Box #414, Marion, Va. 24354

[21] Appl. No.: 388,480

[22] Filed: Aug. 2, 1989

[51] Int. Cl.⁵ .............................................. E05B 75/00
[52] U.S. Cl. .................................... 128/879; 128/878; 70/16
[58] Field of Search ......................... 128/878, 879, 882; 292/DIG. 61; 70/16, 18; 24/16 PB, 17 A, 17 B, 17 AP, 18, 19, 20 S, 331, 334, 115 G, 115 H, 115 M, 117, 118, 712.1, 712.4

[56] References Cited

U.S. PATENT DOCUMENTS

| | | | |
|---|---|---|---|
| 1,056,079 | 3/1913 | Wood | 70/16 |
| 1,387,358 | 8/1921 | Costello | 24/115 G |
| 3,426,559 | 2/1969 | Schubach et al. | 70/16 |
| 3,847,398 | 11/1974 | Kidd | 70/16 X |
| 4,138,867 | 2/1979 | Tompkins | 70/16 |
| 4,328,605 | 5/1982 | Hutchison et al. | 24/115 G |
| 4,379,358 | 4/1983 | Wilbrow | 24/115 M X |
| 4,453,292 | 6/1984 | Bakker | 24/115 G |
| 4,506,417 | 3/1985 | Hara | 24/115 G |
| 4,675,948 | 6/1987 | Bengtsson | 24/115 G |
| 4,854,138 | 8/1989 | Charland | 70/16 |

FOREIGN PATENT DOCUMENTS

| | | | |
|---|---|---|---|
| 1276059 | 10/1961 | France | 24/115 G |
| 2066891 | 7/1981 | United Kingdom | 24/115 G |
| 2108572 | 5/1983 | United Kingdom | 70/16 |

Primary Examiner—Robert A. Hafer
Assistant Examiner—Kevin G. Rooney

[57] ABSTRACT

A pair of handcuffs formed of light weight plastic material, so that the handcuffs cannot be used by a prisoner as a striking weapon against a guard or police officer. A single flexible plastic cord is formed into two loop sections adapted to encircle the prisoner's wrists. Sections of the cord extend through a clamp device that can be manually operated to expand or contract the loop sections, as necessary to remove or install the handcuffs on the prisoner.

2 Claims, 1 Drawing Sheet

KEYLESS HANDCUFFS

BACKGROUND AND SUMMARY OF THE INVENTION

This invention relates to handcuffs used to restrain prisoners from escape or assaultive behavior. Commonly, handcuffs are formed of steel; occasionally a prisoner will attempt to use a metal handcuff as a weapon to assault (strike) a guard or police officer.

In order to overcome the assault problem various plastic handcuffs have been proposed; one example is shown in U.S. Pat. No. 4,071,023 to P. Gregory. As far as I am aware, such plastic handcuffs have been of the disposable type. When the handcuffs are to be removed, they must be cut through using a heavy cutting tool. Such a cutting tool has potential use as a weapon, or fence cutting implement. Therefore, such a tool should not be stored inside a correctional institution where a prisoner could gain possession of the tool.

The present invention is directed to a set of plastic handcuffs that can be reused; the handcuffs can be removed from the prisoner without cutting, or destroying the plastic material. The handcuffs are designed to be opened and closed without using a key.

THE DRAWINGS

DESCRIPTION OF A PREFERRED EMBODIMENT OF THE INVENTION

Figure 1:
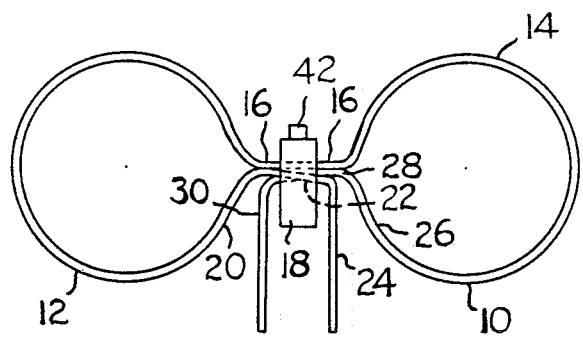
FIG. 1 is an elevational view of a set of handcuffs constructed according to the invention.
Figure 2:
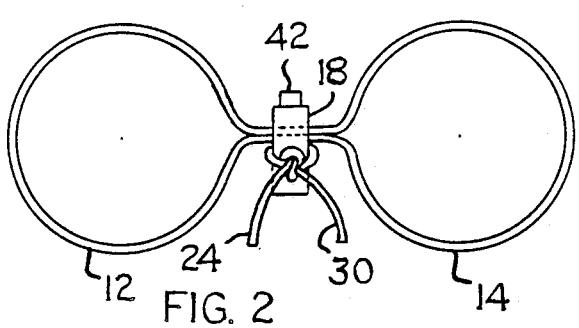
FIG. 2 is a view in the same direction as FIG. 1, but with sections of the handcuff cord formed into a knot.

FIGS. 1 and 2 show one form that the invention can take. The handcuffs there shown comprise a single flexible cord 10, preferably formed of nylon or other relatively strong plastic material. The cord has a circular cross section.

Cord 10 is formed into two loop sections 12 and 14. A loop connector cord section 16 extends between the two loop sections through a small plastic clamp device 18. The clamp device can have a length on the order of one and one half inch, such that the handcuffs can be folded into a relatively small package for storage in the policeman's (or guard's) pocket.

Loop section 12 includes a curved section 20 that leads into a straight clampable section 22 extending in a left-to-right direction through clamp device 18; cord section 22 terminates in a cord end section 24.

Loop section 14 includes a curved section 26 that leads into a straight clampable section 28 extending in a right-to-left direction through clamp device 18. Cord section 28 terminates in an exposed cord end section 30.

Figure 3:
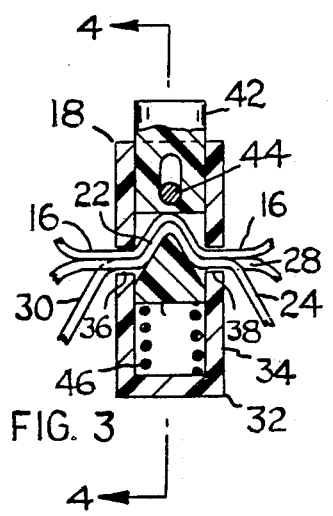
FIG. 3 is a sectional view through a cord clamp device used in the FIG. 1 handcuffs.
Figure 4:
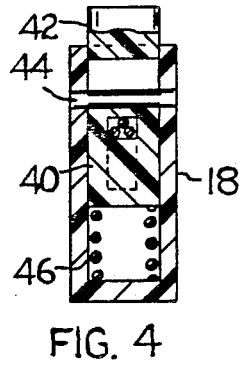
FIG. 4 is a sectional view on line 4—4 in FIG. 3.
Figure 5:
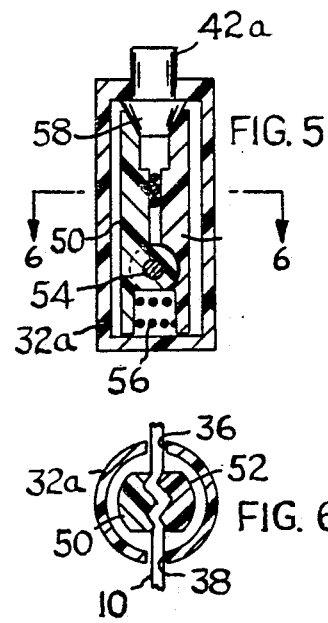
FIG. 5 is a sectional view taken through another clamp device that could be used in the handcuffs of FIGS. 1 and 2.
Figure 6:
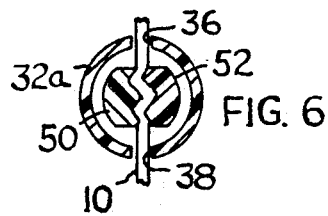
FIG. 6 is a sectional view taken on line 6—6 in FIG. 5.

Clamp device 18 can be constructed in various ways. FIGS. 3 and 4 show one structural form that the clamp device can take. FIGS. 5 and 6 show a second clamping device usable in practice of the invention.

As shown in FIGS. 3 and 4, clamp device 18 comprises a hollow housing 32 having an annular side wall 34 formed with two aligned cord openings 36 and 38 therethrough. The housing forms an internal chamber that houses a cord crimping member 40. Member 40 is integrally connected to a manually-depressible plunger 42 that is slidably supported in a guideway formed by the upper end section of housing wall 34. A pin 44 extends transversely through the housing and a slot in plunger 42 to retain the plunger and crimping member in the housing Compression spring 46 normally biases the plunger and crimping member to the FIG. 3 position.

Crimping member 40 has a U-shaped passage therethrough (FIG. 3), which causes the cord sections 16, 22 and 28 to have crimps formed therein. Such crimps have a clamping effect on the cord sections, such that it becomes difficult to pull the cord end sections 24 and 30 through the clamp device (when member 40 is in the FIG. 3 position).

Thumb-pressure can be applied to plunger 42 to force the plunger and associated crimping member 40 downwardly in housing 32. When plunger 42 is fully depressed a straight through passage will extend through member 40 between the two openings 36 and 38. Either cord end section 24 or 30 can then be pulled through the clamp device without great difficulty.

In use of the handcuff assembly, the guard will loosely position the loop sections 12 and 14 on the prisoner's wrists, after which the guard will use one hand to manually depress plunger 42; at the same time the guard will exert a pulling action on cord end sections 24 and-/or 30. A pull on cord section 24 will contract the loop 12 on one of the prisoner's wrists; a pull o cord section 30 will contract the loop 14 around the prisoner's other wrist.

When the guard releases the pressure on plunger 42, spring 46 will bias member 40 to the FIG. 3 position for forming crimps in the associated cord sections. The crimping action will, in many cases, exert a sufficient clamping action to prevent the prisoner from expanding the loop sections 12 and 14. However, it is preferred to supplement the crimping action by tying the cord end sections 24 and 30 into a knot, as shown at 48 in FIG. 2. The crimping action of clamp device 18 sufficiently immobilizes (stabilizes) the cords that it is impossible for the prisoner to untie knot 48 by pulling on the cord loop sections 12 and 14. The officer can however untie the knot when it is desired to remove the handcuffs.

FIGS. 5 and 6 show a different type of clamping device that can be used. Two jaws, 50 and 52, are swingably mounted on a pin 54 that extends transversely through housing 32a. A compression spring 56 urges the jaws into clamping engagement with the cord sections that extend between openings 36 and 38 in the housing side wall. The facing surfaces of the jaws are corrugated so that crimps are formed in the cord sections.

The jaws may be opened slightly by manual depression of a plunger 42a. Downward movement of the plunger enables a conical section 58 of the plunger to spread jaws 50 and 52 apart, thereby enabling the cord end sections to be pulled through the clamp device so as to expand or contract the cord loop sections 12 and 14 in the previously described fashion.

The described handcuffs are relatively economical to manufacture. They are reusable, and they do not require the use of keys to open or close loops 12 and 14. Also, they are foldable into a small package for easy carrying in the guard's pocket. Of primary importance is the fact that the handcuffs are formed of light weight plastic materials, so that they cannot be used by a prisoner to assault (strike) the guard or police officer.

I claim:

1. A pair of keyless handcuffs comprising a single flexible cord that includes a single loop connector section (16) at an intermediate point along the cord length, a first wrist-encircling loop section (14) extending away from one end of said connector section and then back toward said connector section, a first clampable section (28) extending from said first loop section in side surface contact with the connector section, and a first end section (30) extending from said first clampable section;

said flexible cord further including a second wrist-encircling loop section (12) extending away from the other end of said connector section and then back toward said connector section, a second clampable section (22) extending from said second loop section in side surface contact with said connector section (16), and a second end section (24) extending from said second clampable section; the first clampable section (28) and the second clampable section (22) extending in opposite directions from their respective loop sections (14) and (12);

said keyless handcuffs further comprising a manually openable clamp device that includes a hollow housing having two aligned cord openings (36 and 37) formed therein, a manually-movable cord crimping mechanism within said housing, said crimping mechanism being movable between a cord-disengaged position in which it forms a single straight passage between the aligned openings and a cord-crimping position in which it forms a single U-shaped passage between the aligned openings, and a spring within the housing normally biasing the crimping mechanism to its cord-crimping position except when the mechanism is manually moved to its cord-disengaged position;

said flexible cord being oriented to said clamp device so that said loop connector cord section (16) and the two clampable cord sections (28 and 22) extend together through the crimping mechanism passage and aligned openings.

2. The handcuffs of claim 1, wherein said cord end sections (30 and 24) are knotted after passage through the clamp device.

* * * * *